United States Patent [19]

Wolter et al.

[11] Patent Number: 4,640,203

[45] Date of Patent: Feb. 3, 1987

[54] METHOD AND APPARATUS FOR BURNING COMBUSTIBLE WASTE MATERIALS

[75] Inventors: Albrecht Wolter; Rolf Hartmann, both of Cologne; Horst Herchenbach, Hennef; Alexander Grisar, Mainz-Finthen, all of Fed. Rep. of Germany

[73] Assignees: Klöckner-Humboldt Deutz Aktiengesellschaft; Dyckerhoff Engineering GmbH, both of Fed. Rep. of Germany

[21] Appl. No.: 802,246

[22] Filed: Nov. 27, 1985

[30] Foreign Application Priority Data

Dec. 3, 1984 [DE] Fed. Rep. of Germany ....... 3444073

[51] Int. Cl.4 .............................................. F23G 5/00
[52] U.S. Cl. .................................. 110/346; 110/246; 110/345; 165/104.15; 165/104.18
[58] Field of Search .......... 110/246, 346, 224, 165 R, 110/226, 345; 165/104.15, 104.18; 122/1 A

[56] References Cited

U.S. PATENT DOCUMENTS

| | | | |
|---|---|---|---|
| 1,101,925 | 6/1914 | Harris | 122/2 |
| 2,795,213 | 6/1957 | Cooper | 122/1 A |
| 3,831,668 | 8/1974 | Weissenburg | 165/104.18 |
| 4,232,614 | 11/1980 | Fitch et al. | 110/246 X |
| 4,245,571 | 1/1981 | Przewalski | 110/246 |
| 4,359,006 | 11/1982 | Have | 110/224 X |
| 4,463,686 | 8/1984 | Premel | 110/165 R |

Primary Examiner—Edward G. Favors
Attorney, Agent, or Firm—Hill, Van Santen, Steadman & Simpson

[57] ABSTRACT

A method and apparatus for burning combustible waste materials such as municipal and other refuse, utilizing combustion of the waste materials in a rotary tubular kiln at temperatures above 1200° C., using combustion air in the temperature range between 300° and 800° C. with a small air excess and a reduced quantity of flue gas. The invention further includes heat transfer from the hot flue gas into the combustion air by means of a heat exchanging solid, whereby the solid is heated in contact with the flue gas and subsequently is cooled in contact with air. This air is heated to combustion air temperature and is conducted to the firing of the rotary kiln. The solid may also simultaneously bond noxious substances in the flue gas.

23 Claims, 2 Drawing Figures

METHOD AND APPARATUS FOR BURNING COMBUSTIBLE WASTE MATERIALS

BACKGROUND OF THE INVENTION

1. Field of the Invention

The present invention relates to a method and apparatus for burning waste materials such as household garbage or industrial waste, utilizing a rotary tubular kiln and combustion air which has been preheated in a special manner to provide extremely high combustion air temperatures.

2. Description of the Prior Art

The economical elimination of waste materials such as household garbage and industrial wastes presents a difficult problem. This is particularly true when such waste materials are eliminated in a standard incinerating system. Such systems are predominantly equipped with grate furnaces which must be operated with substantial excesses of air in order to approximate complete combustion. For example, excess air factors of 1.8 to 2.2 are standard in such grate furnaces. Considerable disadvantages occur as a result, among other things, because the furnace operated in such a way generates great quantities of flue gas at a relatively low temperature, for example, between 800° and 900° C. The efficiency of any means inserted for energy recovery into such a stream of flue gas, for example, for generating steam or power, is consequently relatively low. In addition, great quantities of flue gas require large and consequently expensive exhaust gas scrubbing systems.

As a result of the non-homogeneity as well as differences in calorific values of the wastes, and the difficulty of agitating these materials in a grate type incinerator to bring them in contact with combustion air, zones exist in the incinerator in which the required temperature of 800° C. is not reached. In addition, there may be an inadequate supply of oxygen in some zones. This situation is particularly critical when relatively damp waste material or waste material low in calorific value is employed. Uncontrollable regions arise in the incinerator in which combustion at temperatures below 800° C. occurs. At these temperature ranges, however, polychlorinated dibenzodioxins and dibenzofuranes, particularly TCDD and TCDF can be formed in the combustion process in the presence of chlorine and aromatic hydrocarbon molecules such as exist, for example, in chlorine-containing plastics, lignosulphonic acids, pentachlorophenol, polychlorinated biphenyls and the like. The dioxins in particular are very stable even at temperatures of 1000° C. so that they do not decompose in a grate burning system. Dioxin contents have already been documented in flue ash and in cleaned gas dust of various garbage incinerating systems (see "Die Zeit", 2 Mar. 1984 "Dioxin, der Rächer aus der Retorte").

The extreme toxicity of dioxins is known (e.g., "Bild der Wissenschaft", November 1984, pp. 64 through 76). Conventional garbage incineration in grate furnaces has thus been questioned in general (Chemical Engineering, June 6, 1983, pp. 20 through 64).

Theoretically, dioxins which are produced during combustion could be decomposed if the grate firing were to be followed by an after-burning stage having a firing temperature of at least 1200° C. That, however, requires increased capital outlay as well as the use of conventional fuels and consequently would involve an extraordinary amount of expense.

Another possibility, that of performing the combustion by employing high temperature combustion air at higher firing temperatures, fails because 70 to 80% of the combustion air in grate firing is supplied under the grate as primary air and simultaneously serves the purpose of cooling the grate plates, so that heating is only possible within very narrow limits.

A heating of the secondary air would also cause only a relatively slight temperature increase of the flue gases, since the combustion temperatures below the secondary air admission would not be increased.

Finally, a significant increase in the combustion temperature in the grate furnace is not feasible for the reason that the slags present would melt and the grate plates would be attacked.

Due to the relatively low burning temperatures in the grate furnace, only a slight fraction of the heavy metals or heavy metal compounds of the refuse are volatilized. The remainder is carried out with the slag and this makes it difficult to utilize these slags for road construction and similar areas of employment.

Burning household waste in a rotary tubular kiln is currently being applied only to a slight extent. It is said that this procedure has several disadvantages. For example, the rotary kiln itself is more expensive than the grate furnace. The stoking effect, i.e., circulation of the combustible material in order to guarantee oxygen content, decreases with increasing diameter of the rotary tubular kiln so that only relatively small units, up to about 4 m diameter, have been utilized until now for household waste. Also, faultless ignition of the waste cannot always be guaranteed, particularly in the case of damp waste and waste low in calorific value so that support by ignition burners is required. This immediately raises the cost considerably.

In the case of a fluctuating garbage composition, there is a difficulty in insuring the carrying out of the sequence of the various process steps (drying, low temperature carbonization, ignition, burning) in defined regions of the kiln. Thus, there is a disadvantage that these process stages cannot be controlled independently of one another along the axis of the rotary tubular kiln.

SUMMARY OF THE INVENTION

The present invention seeks to provide an improved method and apparatus for burning refuse of the type mentioned in a rotary tubular kiln such that temperatures of at least 1200° C. are achieved in the combustion process while using a low excess of air. Organic compounds, particularly dioxins, are thereby completely decomposed. Beyond this, economically favorable conditions are created to achieve a complete exhaust gas cleaning to eliminate gaseous and dust-like noxious matter and for producing a leaching-resistant slag which is innocuous and can be easily discarded.

The method of burning wastes such as household refuse and wastes similar thereto and for industrial wastes involves the use of a rotary tubular kiln with the admission of preheated combustion air, the air being heated to temperatures in the range between 300° and 800° C. By heating the combustion air to temperatures in this range, an incineration of garbage is achieved with such high temperatures that the formation of dioxins is avoided or a complete decomposition of dioxins already present occurs.

In a preferred embodiment of the present invention, the combustion air is heated to a temperature in the range between 500° and 700° C.

In a further feature of the present invention, heat from the flue gas arising in the garbage incineration is transferred to the combustion air for purposes of heating the air. In addition to high combustion temperatures, the heating of the combustion air to a high temperature level, for example, of 500° to 700° C., also has the following, further advantages:

The heated air acts as a thermal energy carrier in such a manner that, upon admission of air into the kiln, a drying and low temperature carbonization of the wastes is initiated and difficulties in the ignition thereof are effectively overcome, particularly in the case of damp refuse.

Better combustion conditions are obtained for the material which has been predried by the hot combustion air. It also has a better stoking effect. The firing in the kiln can be operated with relatively slight excess quantities of air. As a result, smaller quantities of flue gas are obtained in comparison to conventional grate firings. Consequently, the flue gas scrubbing system can be made correspondingly smaller and the capital and operating costs of the scrubbing system are correspondingly reduced, which reduces a significant part of the costs of garbage incineration.

The lower excess quantity of air also means that a correspondingly smaller quantity of cold air must be heated to combustion air temperature. An elevation of the flue gas temperature with the same available quantity of thermal transfer is thus obtained in the method of the present invention in comparison to known methods. Furthermore, the lower quantity of excess air provides a lower quantity of flue gas at a higher temperature with the same evolution of heat in the firing, and thus yields a correspondingly improved efficiency for exploiting the thermal energy downstream from the garbage incineration.

A further embodiment of the present invention provides preheating of the combustion air to such a high temperature that the flue gases of the garbage incineration reach temperatures of at least 1200° C., so that combustion residues are substantially melted. At these combustion temperatures, all organic compounds and, in particular, dioxins are destroyed. The high temperatures result in a blending of the ash due to the melting of the ash. A slag granulate which may exhibit latent hydraulic characteristics is produced as a result of subsequent cooling of the molten slag in a water bath. There is, therefore, a possibility of economic utilization for these slags, for example, for producing a hydraulic bonding agent by grinding with portland cement clinker.

Because of the high combustion temperatures achieved in accordance with the invention, heavy metals and their compounds are largely volatilized. In comparison to known waste incineration systems, a slag which is significantly lower in noxious material is obtained in the first instance and a uniform slag free of noxious materials is also produced. The content of heavy metals or their compounds is correspondingly increased in the exhaust gas. However, this gas must be cleaned in any event. Dry or wet flue gas scrubbing systems and de-dusting devices are thereby required in any case and are prescribed by law. The residual dusts or flue ash arising must be disposed of in any event. However, in the present invention it is a matter of relatively slight quantities. In comparison, the slag yield is significantly greater. The slag produced according to the present invention is largely free of noxious material and can either be supplied for exploitation of its mineral content or can be disposed of without difficulty.

In a further embodiment of the present invention, the combustion air is heated with at least a part of the flue gases in an indirect heat exchange process.

The elevated combustion air temperature is not only of direct advantage for the combustion process but is also indirectly advantageous for the preliminary stages such as waste drying, low temperature carbonization, and deagglomeration on the basis of a stoking effect.

In a preferred form of the invention, the heat exchange from the flue gas into the combustion air is accomplished with the aid of a heat exchanging medium which consists of solid particles. As a result of employing heat exchanging solids, sufficient heat is transferred from the high temperature flue glass into the combustion air by means of indirect heat exchange and the combustion air is thereby heated to the intended temperature level between 300° and 800° C., preferably between 500° and 700° C. The heat exchanging solid may be heated in a heating stage in contact with a stream of flue gas, subsequently transferred into a cooling stage, and cooled therein in contact with the air which is thereby heated to the combustion air temperature. Thus, a high efficiency process is achieved by the heat transfer in contact with the flue gas and heat exchanging solid on the one hand and between the heat exchanging solid and air on the other without having the air come into direct contact with the flue gas. The heat exchanging mechanism of the present invention consequently functions with indirect heat transfer from the flue gas into the combustion air.

In order to achieve an optimum utilization of the heat content of the flue gas, a further feature of the invention provides that the heat of the flue gas is first partially transferred into the heat exchanging solid, and subsequently utilized for generating useful emergy and, finally, again employed for heat transfer onto the heat exchanging solid for preheating the same. The advantage of this sequential heat transfer operation resides in that the temperature range of the flue gas temperature advantageous for the intended purpose is utilized in each of these stages so, for example, flue gas still having a relatively high temperature level is available for generating useful energy and the waste heat from generating the useful energy is employed for preheating the solid, and the hottest thermal range of the flue gas is available for the highest heating performed on the solid.

Another feature of the invention provides that thermal energy from the flue gas which is not utilized for heating the solid is economically employed in some other fashion, for example, for drying the garbage or for generating steam, for remote heat purposes and/or power, and the like.

The preferred heat transfer solid is a fine grained, mineral solid such as lime or limestone which has the capability of chemically or adsorptively bonding noxious substances released during the garbage incineration. It is particularly advantageous to employ limestone meal or a product, for example, such as raw cement meal which contains limestone as the heat exchanging solid. Limestone meal can be economically produced and due to the high temperatures in the heat transfer, is deacidified to form highly reactive lime. This material has an extremely high melting point so that the formation of melt phases in the heat transfer is avoided in the heat exchanging solid being circulated. Thus, the use of such materials provides not only an advantageous and problem-free possibility of transferring thermal energy into the combustion air but also an intensive cleaning or neutralization effect of the flue gas is also achieved so that noxious substances are chemically or adsorptively bonded by the solid. Consequently, a separate flue gas scrubbing which is standard in conventional garbage incineration systems may be eliminated and thereby achieve a great cost advantage.

In another form of the invention, granulation slag produced in the garbage incineration process is at least partially employed as the heat exchanging solid. The heat exchanging solid is employed in fine grained form, preferably in the form of a solids meal so that the efficiency of the heat transfer is increased as well as the efficiency in the cleaning and neutralization of the flue gas.

In a preferred form of the invention, a majority of the heat exchanging solid traversing the heating and cooling stages is repeatedly conducted in circulation through the heat exchanging system. As a result, there is a thermally favorable preheating of the solid which still contains heat after heating the combustion air. Further, a cleaning or neutralization of the flue gas occurs in temperature ranges of different levels. Among other things, volatile heavy metals or their compounds which cannot be bonded to the solid at relatively high temperature ranges are absorbed by the heat exchanging solid at relatively low temperatures by means of chemical and/or adsorptive bonding.

In order to keep the level of contamination of the solids within limits in the circulation, fresh solid is supplied to the circulating solids based upon the amount of enrichment with noxious materials which has occurred, and used solids are discharged. To accomplish this, the degree of contamination of the solid with noxious materials is identified at a minimum of one location in the circulation system, and is employed as a control quantity for controlling the quantity of solids discharged and/or for the quantity of solids introduced. Due to the relatively large quantities of solids which are required for heat transfer as well as due to the fact that the heat exchanging solid is repeatedly brought into contact with noxious materials during its circulation, a comparatively high noxious material bonding can be achieved, particularly by means of calcareous solids. The quantities of solids to be discharged from circulation and the consumption of fresh solids are correspondingly slight in relationship to the quantity of flue gas. In comparison to dry flue gas scrubbers which are usually employed in garbage incineration systems, the method of the present invention thereby requires significantly lower employment of absorption agents. Thus, smaller quantities of solids whose disposal creates high costs must be eliminated.

Beyond this, short-term elevations of the content of noxious materials in the flue gas can be adjusted for without having to dimension the flue gas disposal means based on the maximum concentration of noxious material in the flue gas.

In order to maintain a balanced circulation, a further feature provides for quantitative flow of the solids conducted in the circulating heat transfer agent to be gravimetrically or volumetrically determined, preferably in the cooled condition, and this derived value is employed as a control quantity for determining the quantity of solids added to the circulating solids stream.

In one form of the invention, in order to maintain a concentration gradient in the cleansing or neutralization activity of the solids, fractions are withdrawn based upon the extent of their accumulation of noxious materials, the sample fractions being withdrawn at different locations in the solids circulation such as those differing in temperature level or at locations having high specific concentrations. Thus, the heavy metals or the compounds bonded to the solids, for example, in a relatively low temperature level are prevented from again being completely volatilized at locations having a higher temperature level.

Another embodiment of the present invention provides that a portion of the heat exchanging solids is delivered into the heating stage to the stream of flue gas, and another portion is delivered to the rotary tubular kiln.

To prevent or reduce an injurious formation of nitrogen oxides at high combustion temperatures, a reducing atmosphere may be established in the heat transfer from the flue gas into the heat exchanging solids by adding fuel. After the completion of the heat exchange, fuel contained in the exhaust gas can be after-burned by adding heated combustion air.

Another modification of the present invention involves adding gaseous oxygen to the incinerating stage to provide an elevated oxygen content in excess of that present in the combustion air. The oxygen can also be added to the fuel gas. With the use of relatively damp waste and waste materials low in calorific value, the added oxygen gas in the rotary tubular kiln effects a significant intensification of the combustion which, moreover, results in diminishing the flue gas arising at high temperature levels.

Finally, the method of the present invention may include the step of conducting the flue gas through a reaction space outside of the rotary tubular kiln before emitting heat, so that the temperature and dwell time of the flue gas in the reaction space can be preset. Since the complete decomposition of organic chemical compounds and, particularly, various dioxins has a required dwell time of flue gas at a predetermined high temperature level, the interposition of the reaction space makes sure that these conditions are met in order to completely decompose the noxious materials even with temporarily less favorable combustion conditions.

An apparatus for burning refuse in accordance with the method of the present invention comprises a rotary tubular kiln in combination with a heating means for generating heated combustion air at a temperature between 300° and 800° C., and preferably between 500° and 700° C. Situated between the rotary tubular kiln and the heating means there may be provided a reaction chamber in communication with the latter.

The heating means for indirect transfer of heat of the flue gas into the combustion air by means of a heat exchanging solid comprises at least two separate heat exchangers, the first heat exchanger being used as a heater for the solid for direct heat exchange with flue gas, and the second heat exchanger being used as a heater for the combustion air for direct heat exchange with the hot heat exchanging solid. The first heat exchanger includes means for conducting hot flue gas and solids therethrough and the second heat exchanger comprises means for conducting hot solids and air to be heated therethrough and means for transferring the heat exchanging solid into the first stage, the heating stage, into the second stage, and into the cooling stage.

Following the heat exchanger, there may be at least one device for utilizing the waste heat of the flue gas for generating useful energy. Following this device for waste heat utilization, there may be a heat exchanger for preheating the solids and transferring the same into the heat exchanger itself.

The heat exchanger may be of the suspension type, including heat exchanger cyclones. Alternatively, at least one heat exchanger may be in the form of a fluidized bed heat exchanger. At least one heat exchanger may be provided with a traveling grate which is contacted by the combustion air and which is covered with the heat exchanging solids. Finally, the rotary tubular kiln may include a discharge for slag and a device which follows downstream for cooling the slag and for granulating the same.

BRIEF DESCRIPTION OF THE DRAWINGS

A preferred embodiment of the invention is set forth below and is shown in the drawing which illustrates further advantageous details. In the drawing.

DESCRIPTION OF THE PREFERRED EMBODIMENTS

Figure 1:
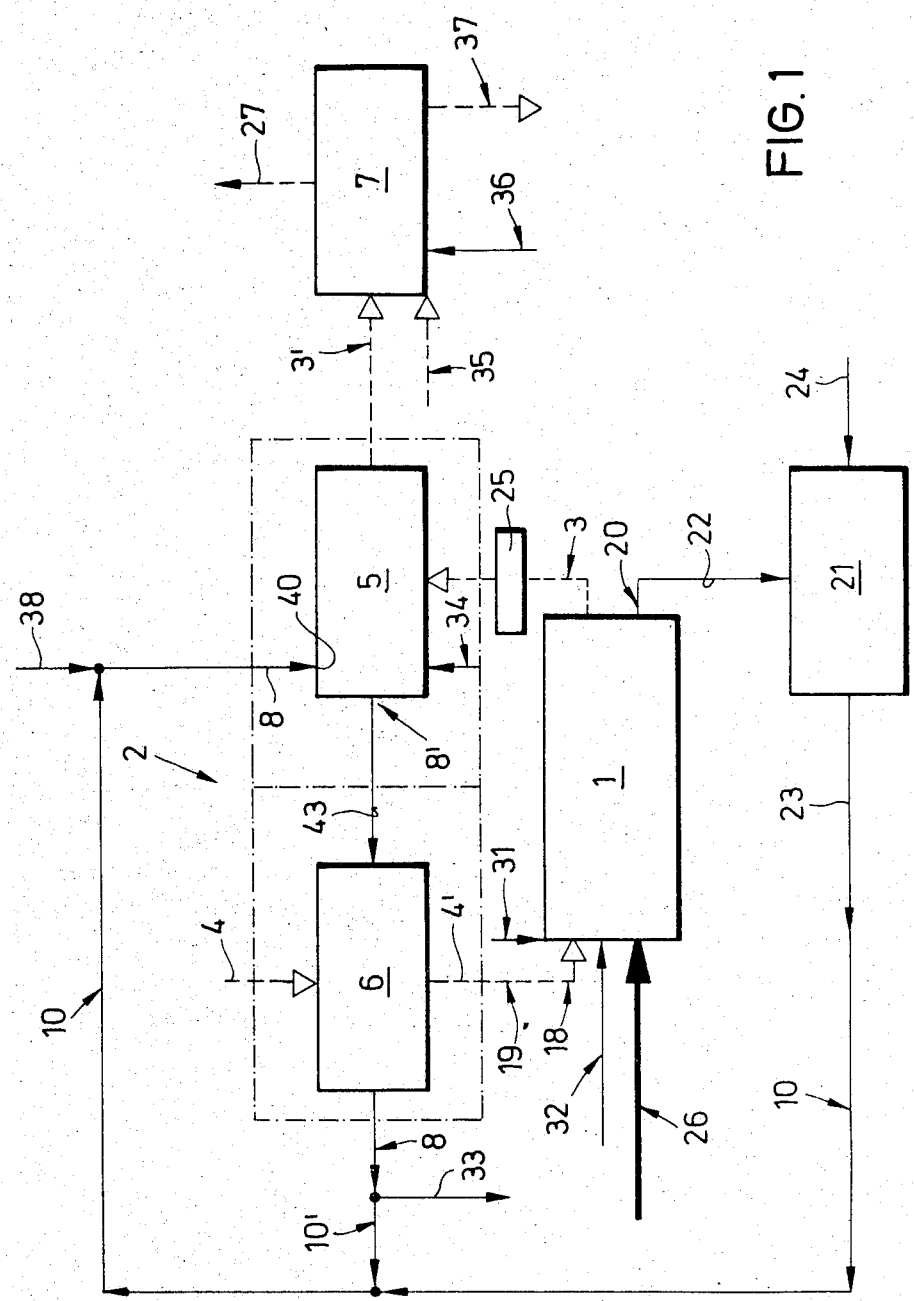
FIG. 1 represents a process flow sheet of the installation in the form of a block diagram.

As shown in the block diagram of FIG. 1, the equipment for burning refuse is equipped with a rotary tubular kiln 1 as the refuse incinerating unit. At the exhaust gas side there is a heat transfer unit generally indicated at reference numeral 2 for transferring heat from flue gas illustrated by the arrow 3 into combustion air illustrated at the arrows 4 and 4' required for the firing. The heat transfer means 2 comprises two separate heat exchangers 5 and 6. The first heat exchanger 5 is employed as a solids heater for the direct heat exchange between flue gas indicated by the arrow 3 and solids indicated by the arrow 8. The second heat exchanger 6 is used as a combustion air heater for direct heat exchange between hot solids indicated by the arrow 8' and air indicated by the arrow 4 to be heated. Each of the heat exchangers 5, 6 comprises means for conducting flue gas and solids or hot solids indicated by the arrow 8' and air therethrough. A conveyor means 43 may be used for transferring the solids heated in the first exchanger 5 into the second heat exchanger 6.

The heat exchangers 5 and 6 can be fashioned in a known way for direct heat exchange between granular or fine grained solids and flue gas or combustion air. They are preferably suspension type heat exchangers comprising heat exchanger units such as heat exchanger cyclones 12 through 18 shown in FIG. 2. The heat exchangers 5 and 6 can also be equipped as fluidized bed heat exchangers or can be equipped with a gas-floodable traveling grate or as a shaft heat exchanger.

Since directly acting heat exchanger devices are well known in the present state of the art, graphic illustrations of the various embodiments have not been illustrated.

As the flow sheet of FIG. 1 illustrates, the heat exchanger 5 is followed downstream by a device 7 for utilizing waste heat. This device may comprise a steam generator but can also comprise other economical devices for utilization of waste heat such as a refuse drier, an energy generator, and the like. In accordance with the exemplary embodiment of FIG. 2, the device 7 for waste heat utilization is followed downstream by a solids preheater 9 and a device 28 for cleaning the exhaust gas 44, such as by means of dust removal and neutralization.

As already mentioned, there is a cost reduction in the use of the flue gas cleaning device 28 since because of the low excess air in the waste burning, the quantity of flue gas generated is considerably lower than in previously known waste incinerating systems. Due to the circulation of the heat exchanging solid, the noxious substances such as chlorides, fluorides, sulfur dioxide and heavy metals or their compounds originally contained in the flue gas are chemically or adsorptively bonded to the heat exchanging solid.

The rotary tubular kiln 1 includes a discharge 20 for molten slag indicated by the arrow 22 and a device 21 for cooling the slag and preferably granulating it. The apparatus further includes conveying means 10, 10' for conveying or circulating solids or slag granulate indicated by the line 23 or limestone into the solids heater 5 or the solids preheater 9.

Refuse is supplied in controlled fashion into the delivery side of the rotary tubular kiln 1. Also discharging into the kiln hood is a conduit 18 for the introduction of hot combustion air. An ignition burner 31 is provided in order to heat up the rotary tubular kiln when the installation is started up and in order to ignite the introduced waste in the inlet line 26 after the installation has been warmed up. The rotary tubular kiln 1 also comprises a device 32 for the admission of solids. These solids may be recirculated solid material having some proportions of slag. Further, fine grained solid in the form of dust proceeds into the rotary tubular kiln 1 with the preheated combustion air through the conduit 18. The arrow 33 indicates a device through which used solids are discharged for waste disposal. Under some conditions, this solid material may be hydrated before disposal. These measures are known per se and are not set forth in greater detail here. Their application will be decided upon by a person skilled in the art based on the measure of the materials composition involved. As needed, the heater 5 may include means 34 for fuel admission. Thus, it is possible to operate under reducing conditions. Carbon is thereby released, and the carbon decomposes nitrogen oxides contained in the flue gas into elemental nitrogen and carbon monoxide under the temperature conditions which prevail. Unconsumed carbon monoxide is after-burned either before or upon entry into the device 7 for waste heat utilization, being burned by the addition of combustion air. The air may enter through a line 35 which is preferably controllable. In the instance where the device 7 is a steam generator, there is included a water intake 36 and a steam discharge 37. The solids heater 5 or the solids preheater 9 is equipped with an admission line 38 for the admission of solids. Minerals having significant contents of calcium oxide, magnesium oxide, silicon oxide, iron oxide, or the like can be used as the solids, these materials also being employed as basic materials for the manufacture of hydraulic bonding agents. These substances are suitable because they are highly active adsorption agents, particularly in their thermally activated condition, for noxious substances contained in the flue gas. The exhaust gas cleaned by the system and, in particular, removed of nitrogen as well as dust, is emitted into the atmosphere or can be subjected to additonal after-treatment for de-dusting. Dust indicated at the exit lines 29 arising in the gas cleaning system 28 can be recirculated into the solids circulation stream or can be disposed of.

The operation of the apparatus proceeds as follows. Wastes introduced through the line 26 are continuously introduced in a chronologically predetermined quantity into the firing of the hot rotary tubular kiln 1 and as a result of the introduction of hot combustion air are thereby first pre-dried, agitated, carbonized at low temperature, and brought to ignition. With a controlled feed of combustion air, the thermal effect of the combustion process is initiated at such a high temperature that flue gas temperatures above 1200° C. are produced. As a result of the relatively high specific heat content of the combustion air, the firing, in contrast to known garbage incinerating methods, can be operated with a slight air excess of, for example, 1.2 to 1.3 times the amount stoichiometrically required for combustion of the refuse.

Flue gas admitted through the line 3 enters the solids heaters 5 in the heat transfer device 2 and is intermittently and repeatedly brought into direct contact with fine grained solids indicated by the line 8. A heat exchange is thereby accomplished in a known way, and the flue gas transfers a part of its heat content to the solids. After separation from the flue gas, the heated solids indicated by the line 8' are conducted into the combustion air heater 6 and are conducted through the combustion air heater where they are cooled by heat exchange with incoming air through the line 4. In this heat transfer process where an intimate and repeated direct blending of air and hot solids indicated by 8' occurs, the air is heated to the appropriate combustion air temperature and is introduced into the rotary tubular kiln 1 through the conduit 18.

The combustion is carried out with a combustion air having a high temperature, for example, in the range between 500° and 700° C. The waste material is thereby dried, agitated and brought to low temperature carbonization and ignited. As a result of the combustion conditions, high flue gas temperatures are established with a relatively slight stoichiometric air excess and lead to a reduction of the quantity of flue gas so the costs for cleaning the flue gas or for scrubbing it are noticeably reduced.

The solids which are largely cooled in the heat exchanger 6 are for the most part recirculated with a conveyor means 10 or 10' to the solids heater 5 or to the solids preheater 9, whereby the heat exchanger circulation is continued in the desired fashion. The advantages that the residual heat remaining in the solids after they have been cooled remains nearly completely preserved in the recirculation into the heat exchanger 5, so that the thermal efficiency of the heat exchanger circulation is improved.

As a result of the high temperatures of the flue gas above 1200° C., organic and inorganic compounds are thermally decomposed into their elements. It is thereby assured that either no dioxins arise or dioxins already present in the refuse are caused to decompose at this temperature.

Figure 2:
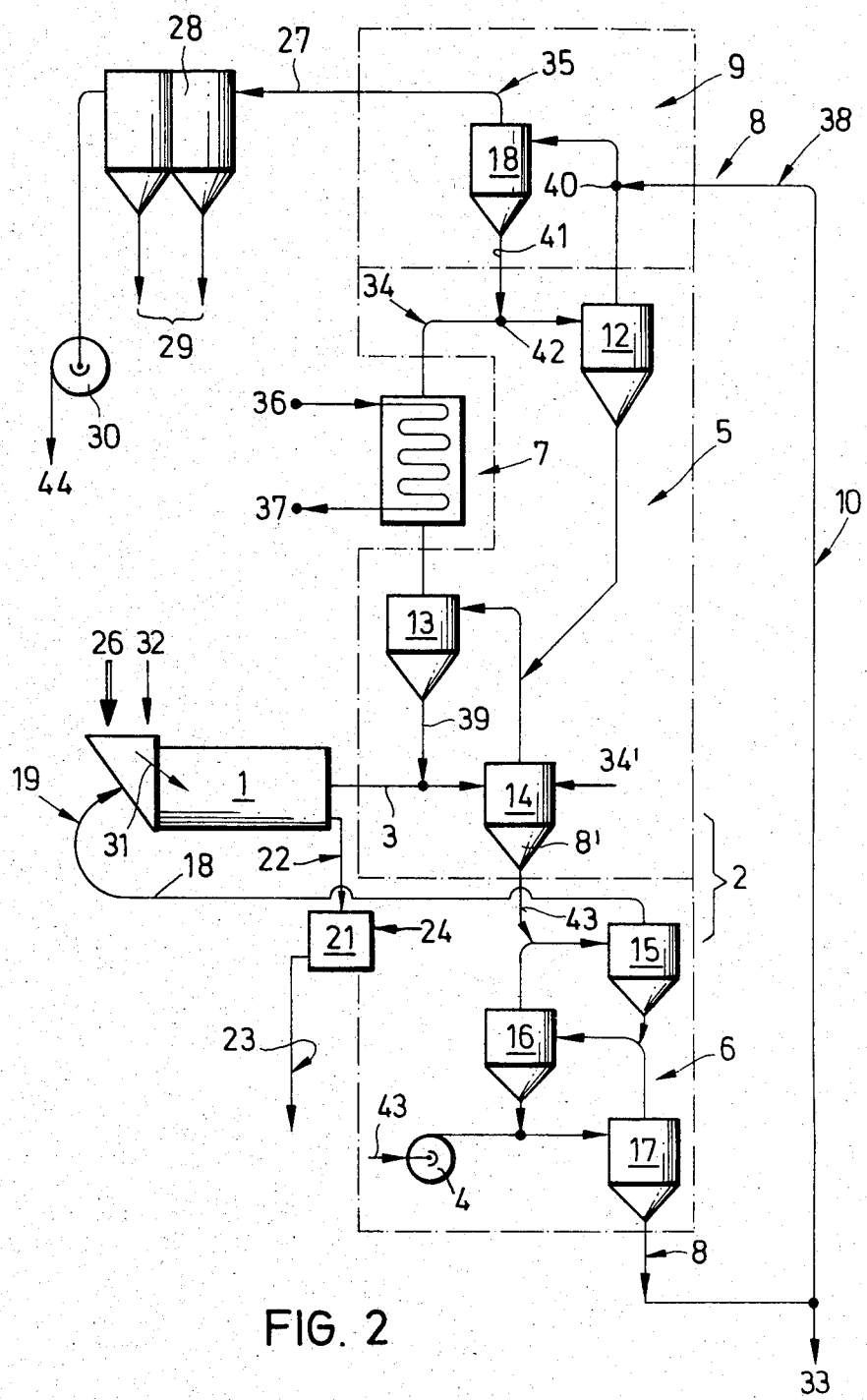
FIG. 2 is an exemplary embodiment of a refuse incinerating system in which the individual elements of the installation are shown in exemplary but purely schematic form.

The above-described installation is graphically shown in schematic form in FIG. 2 wherein the design of the heat exchangers 5, 6 and 9 with heat exchanger cyclones 12 through 18 can be seen. The heat exchanger 6 is equipped as a combustion air heater in the manner of a solids cooler comprising heat exchanger cyclones 15, 16 and 17 whereas the heat exchanger 5 consists of a solids heater comprising heat exchanger cyclones 13 and 14. The solids preheater 9 comprises cyclones 12 and 18. The illustrated number of cyclone stages is only by way of example and can be changed at the discretion of a person having skill in the art in adapting to respectively different operating parameters of a heat exchanger unit.

In the embodiment shown in FIG. 2, hot flue gas in the temperature range of about 1200° C. departs the rotary tubular kiln 1 and is first introduced into a heat exchanger cyclone 14 of the heat exchanger 5. From the heat exchanger cyclone 13 lying thereabove, a conduit 39 conducts solids into the stream of flue gas in the conduit 3. Gas and fine grained solids provide a suspension in which a spontaneous heat exchange occurs between gas and solids. The solids which, for example, may contain rock meal and slag granulate are conveyed from heat exchanger 6 to heat exchanger 9 at a location 40. A first heat exchange with the stream of flue gas occurs here in the solids preheater 9, whereby the solids are preheated. These solids are then introduced by means of a conduit 41 into the solids heater 5 at location 42 and are further heated therein. After separation in the heat exchanger 13, the further heated solids are supplied by means of a conduit 39 to the still uncooled stream of flue gas in the line 3 and are thereby heated to final temperature. After separation in the heat exchanger cyclone 14, the heated solids proceed by means of a conduit 41 into the combustion air heater 6. This heater 6 can fundamentally comprise the same structure and the same function as the heat exchangers 5 and 9 but there is a heat exchange in the opposite sense in that hot solids transfer heat to the cold air applied through an inlet line 43 by means of a blower 4. The air is thereby heated to combustion air temperature lying, for example, between 300° and 800° C. and preferably between 500° and 700° C.

It follows from the examples shown in FIGS. 1 and 2 that the solids can be repeatedly circulated in the system of the present invention. Solids such as lime or limestone, preferably in fine grained form, are supplied into the system at the inlet line 38 and also at an inlet 32. They are mixed with granulated slag which likewise can be delivered into the circulation of the heat exchanging solid. The delivery locations at 32 or 38 are only to be interpreted by way of example and can be varied at the discretion of a person skilled in the art. To the same degree that solids are continuously delivered into the circulation of the system, used solids must be withdrawn which takes place, for example, at at least one discharge as shown by the discharge line 33.

The rotary tubular kiln comprises a metering apparatus for the admission of the waste materials. The conduit 18 for hot combustion air discharges into the rotary tubular kiln 1 at its inlet side. A closing housing (not shown) is situated at the delivery end of the rotary tubular kiln 1 and is fashioned with a slag discharge 20. Molten slag is discharged through a line 22 into a granulating device 21 where it is cooled in a water bath and is subsequently conveyed out with a discharge device (not shown) and is supplied through a line 23 to the conveyor means 10'. A whole or part of the slag granulate can be withdrawn from the system. The granulating device 21 also includes a water intake 24.

The flue gas in the line 3' which has been lowered in temperature after removal of part of its heat content in the heat exchanger 5 can be introduced into a device 7 for waste heat utilization and can be employed, for example, for generating steam. Flue gas emerging from the device 7 proceeds into the solids preheater 9. At the time of the heat transfer, noxious substances from the flue gas are chemically and adsorptively bonded to the heat exchanging solid. Exhaust gas eliminated from the solids preheater 9 with the conduit 27 is de-dusted, for example, in a de-dusting device 28 consisting of an electric or fabric filter. An exhaust fan 30 draws the exhaust through a discharge line 44 out of the system and conveys it into a chimney (not shown). Fuel can be added to the flue gas by means of a fuel admission line 34 or 34' in the region of the heat exchanger 5. The gasification of this fuel produces a reducing atmosphere. Nitrogen oxides which are produced in the firing are thereby reduced to elemental nitrogen and carbon is oxidized upon formation of carbon monoxide. Excess carbon monoxide can be after-burned by supplying additional combustion air through a line 35 into the waste heat utilization device 7 or the solids preheater 9. Dust appearing at the discharge lines 29 from the flue gas filter 28 can either be returned into the solids circulation or discharge from the system depending upon its content of noxious materials.

As may be seen from the illustration and description of the system of the invention, the system is compact, can be governed in an uncomplicated fashion, and is essentially composed of known and proven individual components. As a result of the optimization of the combustion conditions, the system functions extremely economically with avoidance of the formation of toxic substances, particularly dioxins in the flue gas. Due to the high combustion temperatures, the ash is melted, mineralized and primarily forms a leaching-resistant slag which can be used as a construction material but also can be innocuously disposed of. Finally, together with other solids, it can also be employed both as a heat exchanging medium for heating the combustion air as well as a filter material for bonding noxious substances in the flue gas.

The method of the invention and the corresponding apparatus definitely avoid the disadvantages present in the prior art and thus meet the objectives initially cited in an optimum fashion.

It will be understood tha various modifications can be made to the described embodiments without departing from the scope of the present invention.

We claim as our invention:

1. A method for burning combustible waste materials and the like which comprises:
   introducing said waste materials into a rotary tubular kiln to incinerate said waste materials and produce a high temperature flue gas,
   transferring at least a portion of the heat contained in said flue gas to a solid heat exchange medium which has the ability of chemically or adsorptively bonding noxious substances released during the incineration in a heating stage,
   thereafter transferring heat from said solid heat exchange medium to incoming combustion air to heat the same to a temperature in the range from 300° to 800° C., and
   introducing the thus preheated combustion air into said kiln in sufficient quantities to incinerate said waste materials.

2. A method according to claim 1 wherein said combustion air is preheated to a temperature in the range from 500° to 700° C.

3. A method according to claim 1 wherein said combustion air is preheated to a sufficiently high temperature so that the flue gases arising from the incineration in said kiln reach a temperature of at least 1200° C. whereby the combustion residues in said kiln are substantially melted.

4. A method according to claim 1 in which said solid heat exchange medium is in the form of a fine grained meal.

5. A method according to claim 1 wherein at least the major part of said heat exchange medium circulates through said heating stage and said cooling stage and is recycled a plurality of times through said heating and cooling stages.

6. An apparatus for incinerating waste materials which comprises:
   a rotary tubular kiln,
   heating means for generating heated combustion air,
   said heating means being arranged for indirect heat transfer between the heated flue gas of said kiln and combustion air by the circulation of a finely divided heat exchanging solid, said heating means including at least first and second heat exchangers, said first heat exchanger being arranged for direct heat transfer from said heat exchanging solid to air, and
   means for conducting hot flue gas and heat exchanging solid to said second heat exchanger.

7. An apparatus according to claim 6 which includes at least one device downstream of said heating means for utilizing the waste heat of said flue gas.

8. An apparatus according to claim 7 which includes:
   a solids preheater following said device and
   means connecting said preheater to said heating means to deliver preheated solids thereto.

9. An apparatus according to claim 6 wherein said heating means includes a suspension type heat exchanger including heat exchanger cyclones.

10. An apparatus according to claim 6 wherein said heating means includes a fluidized bed heat exchanger.

11. An apparatus according to claim 6 wherein said heating means includes a traveling grate heat exchanger on which heat exchanging solids are heated.

12. An apparatus according to claim 6 which includes means for introducing oxygen gas into said kiln in addition to said heated combustion air.

13. An apparatus according to claim 6 which includes:
   a discharge device on said rotary tubular kiln for discharging slag therefrom, and
   a slag cooler and granulating device receiving slag discharged from said rotary tubular kiln.

14. A method for burning combustible waste materials which comprises:
   introducing said waste materials with combustion air into a rotary tubular kiln at a temperature sufficient to incinerate said waste materials and generate high temperature flue gases,
   heat exchanging at least a portion of said high temperature flue gases with a solid heat exchange medium in a heating stage,
   passing the thus preheated solid heat exchange medium into a cooling stage to transfer heat to a stream of combustion air to thereby preheat said combustion air to a temperature of from 300° to 800° C., and
   recycling at least a major part of said heat exchange medium sequentially through said heating stage and said cooling stage.

15. A method according to claim 14 which includes the step of conducting said flue gases from said kiln into a reaction space outside said kiln before heat exchange with said solid heat exchange medium for a predetermined dwell time to permit said flue gases to achieve a predetermined temperature.

16. A method according to claim 14 which includes the steps of:
   using said flue gas after passing through said heating stage to generate useful energy, and
   thereafter returning said flue gas to said heating stage for further heat exchange with said solid heat exchange medium.

17. A method according to claim 16 which includes the steps of using said flue gas after passing through said heating stage in the drying of refuse.

18. A method according to claim 14 which includes the step:
   introducing fresh heat exchange medium to the heat exchange medium being circulated, and eliminating heat exchange medium laden with noxious substances from circulation.

19. A method according to claim 18 which includes the steps of:
   determining the concentration of noxious substances in said heat exchange medium during circulation, and
   controlling the amount of fresh medium added and the discharge of noxious substance laden medium in response to such determination.

20. A method according to claim 19 which includes the step of:
   measuring the amount of heat exchange medium in circulation while in a cooled condition, and
   adjusting the amount of medium in circulation in reference to such measuring.

21. A method according to claim 20 which includes the steps of:
   sampling the heat exchange medium being circulated at different locations in such circulation which are at different temperature levels.

22. A method according to claim 14 which includes the steps of:
   supplying a portion of said solid heat exchange medium to said rotary tubular kiln.

23. A method according to claim 14 which includes the steps of:
   introducing a fuel into the flue gas from said kiln to establish a reducing atmosphere during heat exchange with said solid heat exchange medium, and
   burning fuel contained in the exhaust gas occurring after the heat exchange has taken place.

* * * * *